Patented May 8, 1951

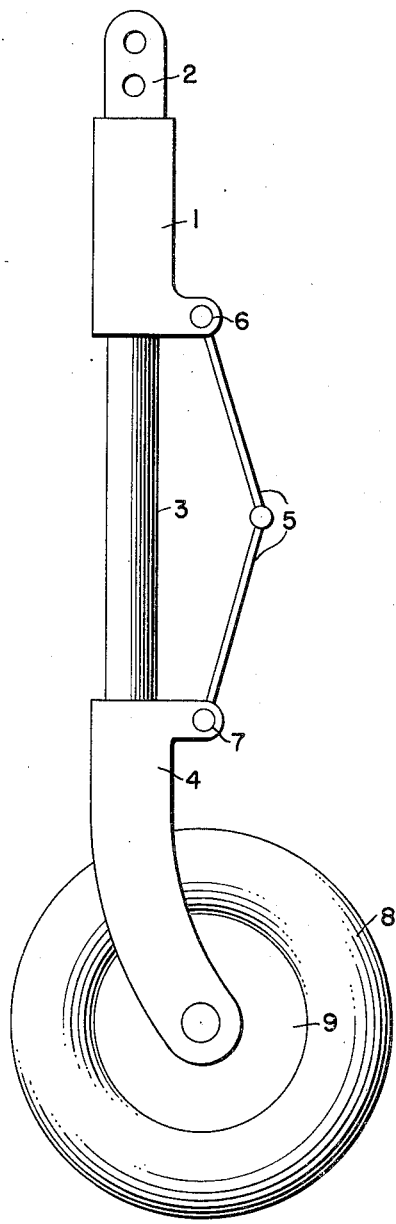
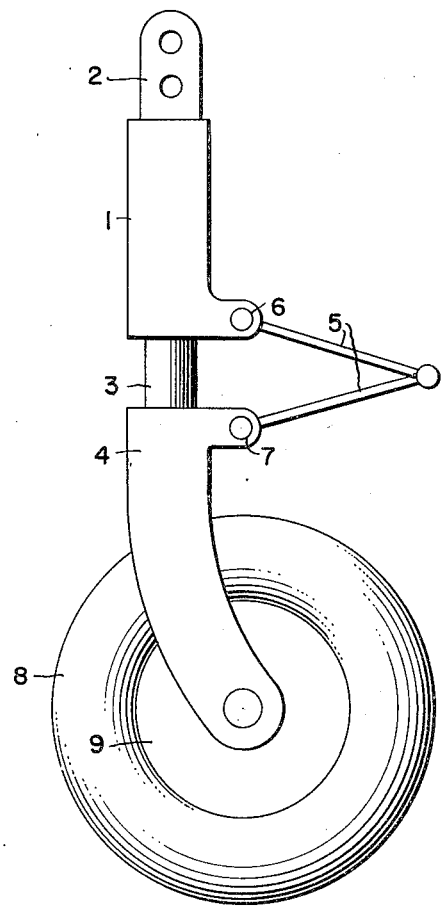
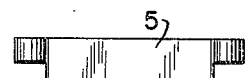
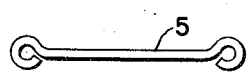

2,551,665

UNITED STATES PATENT OFFICE 2,551,665

AIRPLANE CROSS-WIND LANDING GEAR

John Harlin Geisse, Washington, D. C.

Application February 17, 1947, Serial No. 729,039

3 Claims. (Cl. 244—104)

My invention relates to improvements in airplane cross-wind landing gear which employ collapsible struts to absorb landing loads so installed that their axes extended would intersect the ground at points ahead of the points of contact of the wheels with the ground; and the object of my invention is to permit each wheel to caster about the axis of its strut and to provide a yielding resistance to such castering which is greater when the strut is collapsed than it is when the strut is extended. A further object of my invention is to provide a design which would require a minimum of changes from existing undercarriages.

I attain these objects by mechanism illustrated in the accompanying drawing, in which Figure I is a side view of one wheel and strut assembly with the strut in the extended position and Figure II is a similar view with the strut collapsed. Figures III and IV are two views of the element which provides the variable yielding resistance to wheel castering.

Similar numerals refer to similar parts throughout the several views.

The cylinder 1 constitutes the upper part of the collapsible strut and is provided with means 2 for attachment to the body of the airplane. Cylinder 3 constitutes the lower part of the collapsible strut and has attached thereto the wheel fork 4 in which is mounted the wheel 9 carrying the tire 8. Elements 5 pivotably connected together, one of which is pivotably attached to the upper part of the strut at 6 and the other pivotably attached to the lower part of the strut at 7 constitute what is generally termed, in aviation parlance, the nut cracker.

All of these parts are now in common use in airplane undercarriages. It is only in the design of the elements 5 that my invention departs from standard practice. In all undercarriages heretofore used the nut cracker is used to prevent the turning of the lower element of the strut with respect to the upper element. This has been their primary function and they have been designed with sufficient rigidity to accomplish this function. In most cases they have been forgings or castings which would permit of a minimum of flexure before failure.

In my invention, elements 5 are made of flat spring steel or other spring material. A suitable design is shown in Figures III and IV from which it will be apparent that the section chosen is such that the resistance to torsional flexure is very low as compared to the resistance to bending in the plane of Figure III.

Referring now to Figures I and II it will be apparent that the flexure of elements 5 required to permit rotation of the lower part of the strut relative to the upper part changes from one consisting primarily of torsion when the strut is extended to one consisting primarily of bending in the plane of Figure III when the strut is collapsed.

In operation, then, when the wheel first contacts the ground, and irrespective of the force of that contact, it may caster with a comparatively light resistance to castering but as the strut collapses into the taxiing position the resistance to castering will increase and the wheel will tend to return to its neutral position.

It will be apparent to one skilled in the art that the castering effect obtained by the offset of the wheel fork can also be obtained with a straight wheel fork by inclining the axis of the strut. It will also be apparent that the nut cracker could be replaced with a simple flat spring rigidly or pivotably attached at opposite ends to the two parts of the strut and designed to accommodate the collapse of the strut by bending.

I claim:

1. An airplane undercarriage including main wheels, a casterable mounting for each of said main wheels, and a collapsible strut for each main wheel, each of said struts having an upper part and a lower part, a spring element hinged to the upper part, another spring element hinged to the lower part, and a hinge connecting the two spring elements.

2. A cross-wind landing gear for airplanes including a generally vertically extending shock absorber strut, adapted to be secured to an airplane at its upper end, a castering ground-engaging wheel mounted on the lower end of the strut, said strut comprising two telescopically-engaging members, pivot pin means mounted on each telescopic member on normally parallel, vertically spaced axes transverse to the axis of the telescopic members, flat spring levers having dimensions of length, breadth and thickness, each mounted at one end of each of said pivot pin means and with its dimension of breadth parallel with the axis of said pivot pin means, said levers being pivotally connected together at their other ends on an axis normally parallel to the axes of said pivot pin means, said flat spring levers being deformable in torsion about an axis along their dimensions of length, said levers and pivot pin means constituting a flexible nutcracker linkage connecting the upper and lower shock absorbing members whereby as the strut is collapsed during landing the nutcracker linkage folds causing the torsional resistance of said linkage to gradually increase thus imposing increasing resistance to castering of the ground engaging wheel.

3. A cross wind landing gear for airplanes including in combination a collapsible shock strut for the absorption of landing gear shock having an upper member and a lower member reciprocatable and rotatable in the upper member, a ground engaging wheel mounted on the lower member in casterable relationship to the upper member, a jackknife member attached at its opposite extremities to the upper and lower shock strut members and including a spring leaf in said jackknife member adapted to restrain rotation of the lower shock strut member in the upper shock strut member.

JOHN HARLIN GEISSE.

REFERENCES CITED

The following references are of record in the file of this patent:

UNITED STATES PATENTS

| Number | Name | Date |
|---|---|---|
| 781,693 | Tandy | Feb. 7, 1905 |
| 1,874,782 | McMurtrey | Aug. 30, 1932 |
| 2,384,054 | Trautman | Sept. 4, 1945 |
| 2,396,318 | De Bell | Mar. 12, 1946 |

FOREIGN PATENTS

| Number | Country | Date |
|---|---|---|
| 642,826 | Germany | Mar. 17, 1937 |
| 691,789 | Germany | June 5, 1940 |